US012671285B2

(12) United States Patent
Kim et al.

(10) Patent No.: US 12,671,285 B2
(45) Date of Patent: Jun. 30, 2026

(54) ROTOR FOR MOTOR AND METHOD OF MANUFACTURING THE SAME

(71) Applicants: Hyundai Motor Company, Seoul (KR); Kia Corporation, Seoul (KR); KCC Corporation, Seoul (KR)

(72) Inventors: Sung Min Kim, Seoul (KR); Dong Kyu Won, Daejeon (KR); Pung Koc Hwang, Jeonbuk-do (KR); Ji Seung Park, Jeonbuk-do (KR); Byung Seon Kong, Gyeonggi-do (KR)

(73) Assignees: HYUNDAI MOTOR COMPANY, Seoul (KR); KIA CORPORATION, Seoul (KR); KCC CORPORATION, Seoul (KR)

( * ) Notice: Subject to any disclaimer, the term of this patent is extended or adjusted under 35 U.S.C. 154(b) by 238 days.

(21) Appl. No.: 18/603,626

(22) Filed: Mar. 13, 2024

(65) Prior Publication Data

US 2025/0141290 A1 May 1, 2025

(30) Foreign Application Priority Data

Oct. 27, 2023 (KR) ........................ 10-2023-0145361

(51) Int. Cl.
| | |
|---|---|
| *H02K 1/28* | (2006.01) |
| *C08L 63/00* | (2006.01) |
| *H02K 1/04* | (2006.01) |
| *H02K 1/2795* | (2022.01) |
| *H02K 15/03* | (2025.01) |
| *H02K 15/12* | (2025.01) |
| *H02K 21/24* | (2006.01) |

(52) U.S. Cl.
CPC ................ *H02K 1/28* (2013.01); *C08L 63/00* (2013.01); *H02K 1/04* (2013.01); *H02K 1/2795* (2022.01); *H02K 15/03* (2013.01); *H02K 15/12* (2013.01); *H02K 21/24* (2013.01)

(58) Field of Classification Search
CPC .......... H02K 1/28; H02K 1/2795; H02K 1/04; H02K 15/03; H02K 15/12; H02K 21/24
USPC .... 310/43, 154.07, 154.21, 156.32, 267–268
See application file for complete search history.

(56) References Cited

U.S. PATENT DOCUMENTS

2006/0119204 A1* 6/2006 Awazu ................. H02K 1/2791
310/156.53

* cited by examiner

*Primary Examiner* — Jose A Gonzalez Quinones
(74) *Attorney, Agent, or Firm* — MCDONNELL BOEHNEN HULBERT & BERGHOFF LLP

(57) ABSTRACT

A method of manufacturing a rotor for a motor and a rotor for a motor manufactured by the same are disclosed. The method includes providing a rotor plate, a rotor core, and a plurality of permanent magnets, integrally coupling the rotor core to the rotor plate. The method also includes forming a molding part by molding a resin composition for a molding material on the plurality of permanent magnets so that the molding part is shaped to integrally connect the plurality of permanent magnets arranged in a circumferential direction of the rotor. The rotor is manufactured to have a configuration in which the rotor plate, the rotor core, the plurality of permanent magnets, and the formed molding part are integrated.

18 Claims, 6 Drawing Sheets

⇧ ⇧ : Flux direction

⇧ ⇧ : Flux direction

ROTOR FOR MOTOR AND METHOD OF MANUFACTURING THE SAME

CROSS-REFERENCE TO RELATED APPLICATION

This application claims under 35 U.S.C. § 119(a) the benefit of Korean Patent Application No. 10-2023-0145361 filed on Oct. 27, 2023, the entire contents of which are incorporated herein by reference.

BACKGROUND

(a) Technical Field

The present disclosure relates to a rotor for an axial flux motor (AFM) and a method of manufacturing the same, and more particularly, to a rotor for an axial flux motor and a method of manufacturing the same, which are capable of solving a problem of a non-uniform air gap dimension caused by manufacturing and assembling deviations between individual components and ensuring horizontality and an inner/outer diameter tolerance.

(b) Background Art

In general, motors refer to devices that obtain rotational power by converting electrical energy into mechanical energy. The motors are classified into an alternating current motor and a direct current motor depending on the types of power applied from the outside. The motor operates on the principle that torque of a rotor is generated by a rotation magnetic field generated when current flows through a wound coil.

A typical motor includes a housing, a stator fixedly coupled in the housing and having cores around which coils are wound, and a rotor installed to face the stator, coupled to permanent magnets, and configured to be rotated by a magnetic force generated between the permanent magnets and the coils.

In addition, the motors may be classified into a radial flux motor (RFM) and an axial flux motor (AFM) depending on magnetic flux directions.

FIG. 1 is a view illustrating a configuration and arrangement of a radial flux motor and magnetic flux directions, and FIG. 2 is a view illustrating a configuration and arrangement of an axial flux motor and magnetic flux directions.

In the drawings, reference numeral '1' indicates a stator, reference numerals '2' and '3' indicate a stator core and a coil, reference numeral '4' indicates a rotor, and reference numerals '5' and '6' indicate a rotor core and a permanent magnet.

As illustrated in FIG. 1, the radial flux motor is a motor in which magnetic flux is directed in a radial direction, and most general motors, such as a surface-mounted permanent magnet (SPM) motor or an interior permanent magnet (IPM) motor are the radial flux motors.

As illustrated in FIG. 2, the axial flux motor is a motor in which magnetic flux is directed in an axial direction, an air gap is planar, and magnetic field distribution defined in the axial direction is perpendicular to an air gap plane. A disc-type motor typically having a large air gap area is being developed.

The axial flux motor is advantageous in generating torque because an air gap, in which an electromagnetic force is applied, is large and an air gap radius is large compared to the radial flux motor, and has high-torque, high-output, lightweight, and high-efficiency features. Therefore, the axial flux motor is suitable for industrial fields that require high torque density and small scales.

In addition, regarding cooling methods, a more effective direct cooling method may be applied to the axial flux motor because the stator 1 of the axial flux motor may be cooled by being submerged in oil as a whole. Therefore, the axial flux motor is excellent in motor cooling performance and advantageous in continuous output.

FIG. 3 is a perspective view illustrating a rotor of the axial flux motor, and FIG. 4 is a cross-sectional view illustrating a state in which the rotor of the axial flux motor is assembled. Reference numeral '7' indicates a rotor plate bonded to the rotor core 5.

As illustrated, the rotor 4, which constitutes the axial flux motor, includes the rotor cores 5, a plurality of permanent magnets 6 disposed on the rotor core 5, and the rotor plate 7 integrally coupled to the rotor cores 5.

As illustrated in FIGS. 2 and 3, the stator 1 and the rotor 4 of the axial flux motor are manufactured and disposed to have a structure for maintaining an axial air gap. A rotary shaft of the motor is coupled to the rotor plate 7 (made of S45C, for example), such that the rotor cores 5, the permanent magnets 6, and the rotor plate 7 are rotated integrally with the rotary shaft. A support ring 8 of the rotor plate 7 is a component that prevents the permanent magnets 6 from being scattered by a centrifugal force.

As illustrated in FIG. 4, during a process of assembling the rotor, the rotor cores 5 (e.g., SMC and electric steel sheet) are bonded to the rotor plate 7 by means of a bonding agent 9. The permanent magnets 6, which are separated from one another, are bonded to the rotor cores 5 by means of the bonding agent 9. As described above, the rotor of the axial flux motor has a structure in which the rotor cores 5, the permanent magnets 6, and the rotor plate 7 are bonded by the bonding agent 9.

Meanwhile, as illustrated in FIG. 3, the separated permanent magnets 6 of the axial flux motor are disposed in a circumferential direction in order to reduce an eddy current loss. In this case, an accumulated tolerance may occur based on a level of precision in processing the permanent magnets 6.

In more detail, thickness deviations between the manufactured permanent magnets 6 may be present in the axial flux motor in the related art. Further, because the plate 7, the cores 5, and the separated permanent magnets 6 are separately fixed by the bonding agent 9, assembling deviations may occur between positions of the individual permanent magnets bonded to the cores. For this reason, an air gap imbalance may occur in which a size of the air gap between a surface of the permanent magnet of the rotor and the stator varies depending on the positions of the permanent magnets.

That is, the plurality of separated permanent magnets 6 are bonded and fixed to the surface of the rotor core 5 in the circumferential direction by the bonding agent 9. In this case, the size of the air gap between the permanent magnet and the stator may vary depending on the position of the permanent magnets because the separated permanent magnets 6, the core 5, and the plate 7 are separately bonded by the bonding agent 9 in a situation in which there are deviations between sub-components, e.g., there are manufacturing or assembling deviations between the permanent magnets 6.

With reference to FIG. 5, the permanent magnets 6, which are individually bonded by the bonding agent (not illustrated in FIG. 5), have different thicknesses and surface heights, which may cause air gaps x and y with respect to the stator 1 to be greatly different from each other.

Eventually, a suction force indicated by arrow 'F' in FIG. 5 may be applied because of dissatisfaction with a target air gap dimension and non-uniformity of axial electromagnetic forces, and the suction force may degrade the performance of the actually manufactured product in comparison with the analysis model and design specifications.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-mentioned problem, and an object of the present disclosure is to provide a rotor for an axial flux motor (AFM) and a method of manufacturing the same, which are capable of solving a problem of non-uniformity of an air gap dimension caused by manufacturing and assembling deviations between individual components and ensuring horizontality and an inner/outer diameter tolerance.

The object of the present disclosure is not limited to the above-mentioned object, and other objects, which are not mentioned above, may be clearly understood from the following descriptions by those with ordinary skill in the art (hereinafter, referred to as 'those skilled in the art') to which the present disclosure pertains.

In one aspect, the present disclosure provides a method of manufacturing a rotor for a motor, the method including: preparing a rotor plate, a rotor core, and a plurality of permanent magnets; coupling the rotor core to the rotor plate; and forming a molding part, which is formed by molding a resin composition for a molding material, on the plurality of permanent magnets so that the molding part is shaped to integrally connect the plurality of permanent magnets arranged in a circumferential direction of the rotor core, in which the rotor is manufactured to have a configuration in which the rotor plate, the rotor core, the plurality of permanent magnets, and the formed molding part are coupled.

In another aspect, the present disclosure provides a rotor for a motor, the rotor including: a rotor core; a plurality of permanent magnets installed to be arranged in a circumferential direction of the rotor core; a rotor plate coupled to the rotor core; and a molding part formed by molding a resin composition for a molding material on the plurality of permanent magnets so that the molding part is shaped to integrally connect the plurality of permanent magnets arranged in the circumferential direction, in which the rotor has a configuration in which the rotor plate, the rotor core, the plurality of permanent magnets, and the formed molding part are coupled.

Therefore, according to the rotor for an axial flux motor and the method of manufacturing the same according to the present disclosure described above, the molding technology using the resin composition for a molding material may be used to solve the problem of non-uniformity of the air gap dimension caused by manufacturing and assembling deviations between the individual sub-components and to ensure the horizontality and the inner/outer diameter tolerance.

As a result, it is possible to solve the problem of the occurrence of the permanent magnet suction force toward the stator caused by non-uniformity of the air gap and non-uniformity of the axial electromagnetic force and to solve the problem of deterioration in performance of the actually manufactured product in comparison with the analysis model.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
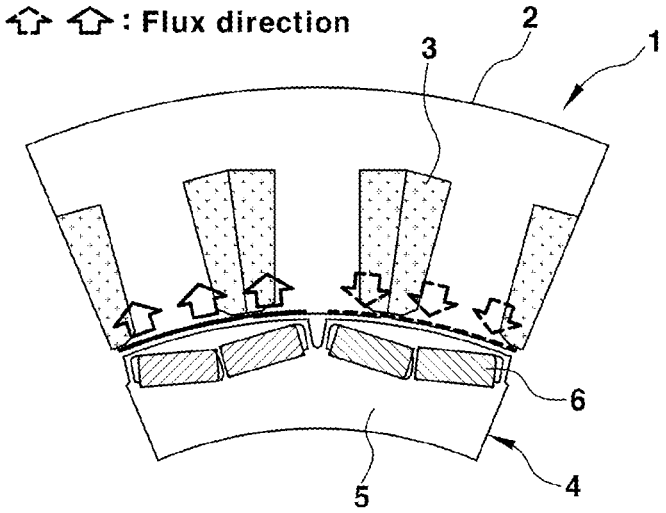
FIG. 1 is a view illustrating a configuration and arrangement of a general radial flux motor and a magnetic flux direction.
Figure 2:
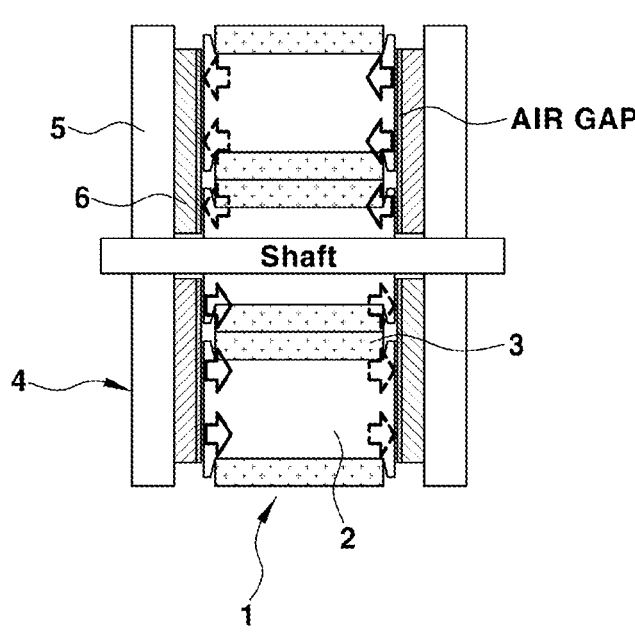
FIG. 2 is a view illustrating a configuration and arrangement of a general axial flux motor and a magnetic flux direction.
Figure 3:
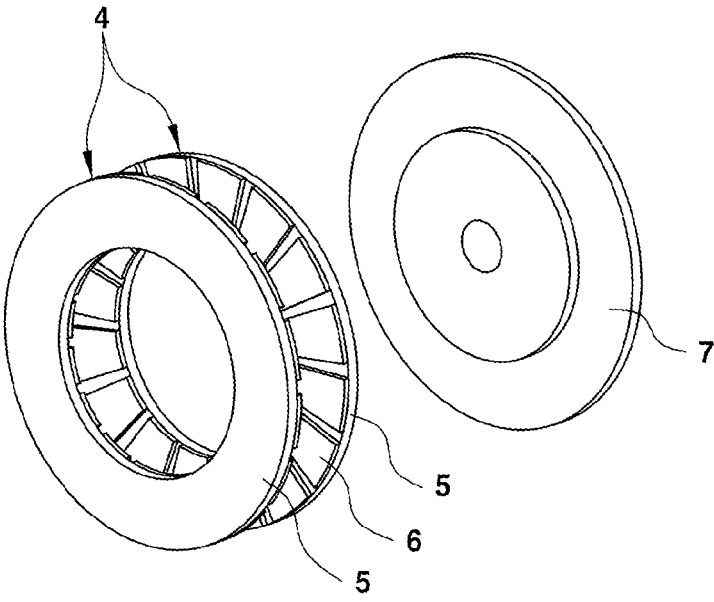
FIG. 3 is a perspective view illustrating a rotor of the general axial flux motor.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Hereinafter, the embodiments of the present disclosure will be described in detail with reference to the accompanying drawings. Specific structural and functional descriptions suggested in embodiments of the present disclosure are exemplified only for the purpose of explaining embodiments according to the concept of the present disclosure, and the embodiments according to the concept of the present disclosure may be carried out in various forms. In addition, the present disclosure should not be interpreted as being limited to the embodiments disclosed in the present specification, and it should be understood that the present disclosure includes all modifications, equivalents, and alternatives included in the spirit and the technical scope of the present disclosure.

Meanwhile, the terms such as "first" and/or "second" in the present disclosure may be used to describe various constituent elements, but these constituent elements should not be limited by these terms. These terms are used only for the purpose of distinguishing one constituent element from other constituent elements. For example, without departing from the scope according to the concept of the present disclosure, a first constituent element may be referred to as a second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

Like reference numerals indicate like constituent elements throughout the specification. The terms used in the present specification are for explaining the exemplary embodiments, not for limiting the present disclosure. Unless particularly stated otherwise in the present specification, a singular form also includes a plural form. The terms "comprise (include)" and/or "comprising (including)" used in the specification are intended to specify the presence of the mentioned constituent elements, steps, operations, and/or elements, but do not exclude presence or addition of one or more other constituent elements, steps, operations, and/or elements.

In the related art described above, sub-components, i.e., a rotor plate, rotor cores, and a plurality of separated permanent magnets, which constitute a rotor, are separately manufactured and prepared, and then the rotor for an axial flux motor is assembled by separately bonding the manufactured components with a bonding agent.

In contrast, the present disclosure is mainly characterized in that in order to solve several problems in the related art, resin is molded integrally with sub-components by using a molding process using a resin composition for a molding material, and then the sub-components molded with the resin are assembled, thereby manufacturing a rotor for an axial flux motor.

A method of manufacturing a rotor for a motor according to the present disclosure includes providing a rotor plate, a rotor core, and a plurality of permanent magnets, integrally coupling the rotor core to the rotor plate, forming a molding part, which is formed by molding a resin composition for a molding material, on the plurality of permanent magnets to define a shape in which the plurality of permanent magnets arranged in a circumferential direction of the rotor is integrally connected, and completing the rotor in which the rotor plate, the rotor core, the plurality of permanent magnets, and the formed molding part are integrated by curing the resin composition for a molding material. In this case, an epoxy resin composition for a molding material (epoxy molding material composition) may be used as the resin composition for a molding material.

Hereinafter, the rotor for an axial flux motor and the method of manufacturing the same according to the embodiment of the present disclosure will be described more specifically.

Figure 6:
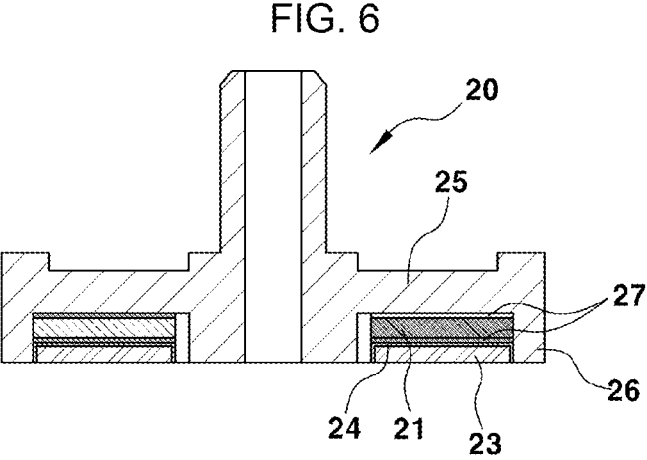
FIG. 6 is a cross-sectional view illustrating a rotor according to a first embodiment of the present disclosure.
Figure 7:
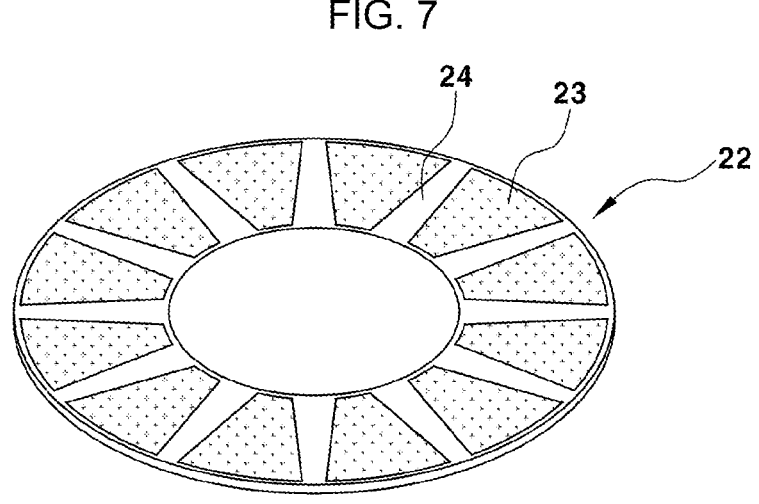
FIG. 7 is a perspective view illustrating a permanent magnet resin molded product manufactured by a molding process using a resin composition for a molding material in the rotor according to the first embodiment of the present disclosure.

First, FIG. 6 is a cross-sectional view illustrating a rotor according to a first embodiment of the present disclosure, and FIG. 7 is a perspective view illustrating a permanent magnet resin molded product manufactured by a molding process using a resin composition for a molding material in the rotor according to the first embodiment of the present disclosure.

In the first embodiment of the present disclosure, a molding process is performed to integrally connect a plurality of separated permanent magnets 23 by means of a molding part made of a resin composition for a molding material. For example, the molding process is performed by using an epoxy resin composition for a molding material. That is, an integrated permanent magnet resin molded product 22 is manufactured by forming a molding part 24, which is formed by molding an epoxy resin composition for a molding material, on the plurality of separated permanent magnets 23.

The plurality of permanent magnets 23 are provided on the permanent magnet resin molded product 22 and disposed in a circumferential direction at predetermined intervals. In this case, only one surface of each of the permanent magnets 23 may be exposed to the outside, and the remaining surface of each of the permanent magnets 23 may be embedded in the molding part 24.

Next, the manufactured permanent magnet resin molded product 22 is integrally coupled to a rotor core (hereinafter, simply referred to as a 'core') 21 and a rotor plate (hereinafter, simply referred to as a 'plate') 25 that are separately manufactured. In this case, a rotor 20 is completed by bonding, by using a bonding agent 27, the rotor core 21, the rotor plate 25, and the permanent magnet resin molded product 22 that are separately manufactured.

During the molding process using the resin composition for a molding material, the plurality of permanent magnets 23 is installed in a cavity of a mold so as to be disposed at predetermined intervals in the circumferential direction, the molten resin composition for a molding material is injected into the cavity of the mold in which the permanent magnets 23 are installed, and the injected resin composition for a molding material is integrally molded into the molding part 24 so that the molding part 24 is attached to all the permanent magnets 23 and the resin composition for a molding material covers at least a part of each of the permanent magnets 23.

In this case, one surface of each of the permanent magnets 23 may be exposed to the outside. That is, one surface of each of the permanent magnets 23 is exposed to the outside, the remaining lateral surface and the other surface of each of the permanent magnets 23, except for one exposed surface, may be covered by the molding part 24 formed by molding the resin composition for a molding material.

During the process of injecting and molding the resin composition for a molding material, the resin composition for a molding material is injected in the state in which the plurality of permanent magnets 23 are disposed in the cavity of the mold and disposed at predetermined intervals in the circumferential direction. Prior to the injection process, a process of correcting an individual height deviation of the permanent magnet 23 may be performed by using a slide structure in the mold.

After the resin composition for a molding material is injected, a curing process is performed, and then the mold is opened. Thereafter, the molded product (hereinafter, referred to as the 'permanent magnet resin molded product') 22 integrally molded into the molding part 24 on the plurality of permanent magnets 23 arranged in the circumferential direction is ejected and extracted from the mold.

FIG. 7 illustrates an example of the permanent magnet resin molded product 22 integrally manufactured by forming the molding part 24 on the plurality of permanent magnets 23 arranged in the circumferential direction. As illustrated, the integrated permanent magnet resin molded product 22 includes the plurality of permanent magnets 23 disposed at predetermined intervals in the circumferential direction, and the molding part 24 formed to integrally connect the plurality of permanent magnets 23.

When the permanent magnet resin molded product 22, which has the structure in which the plurality of permanent magnets 23 are integrally connected by the molding part 24, is manufactured by the molding process using the resin composition for a molding material as described above. The rotor 20 is completed by bonding the permanent magnet resin molded product 22 to the core 21 using the bonding agent 27, and bonding the core 21 and the plate 25 using the bonding agent 27.

Figure 8:
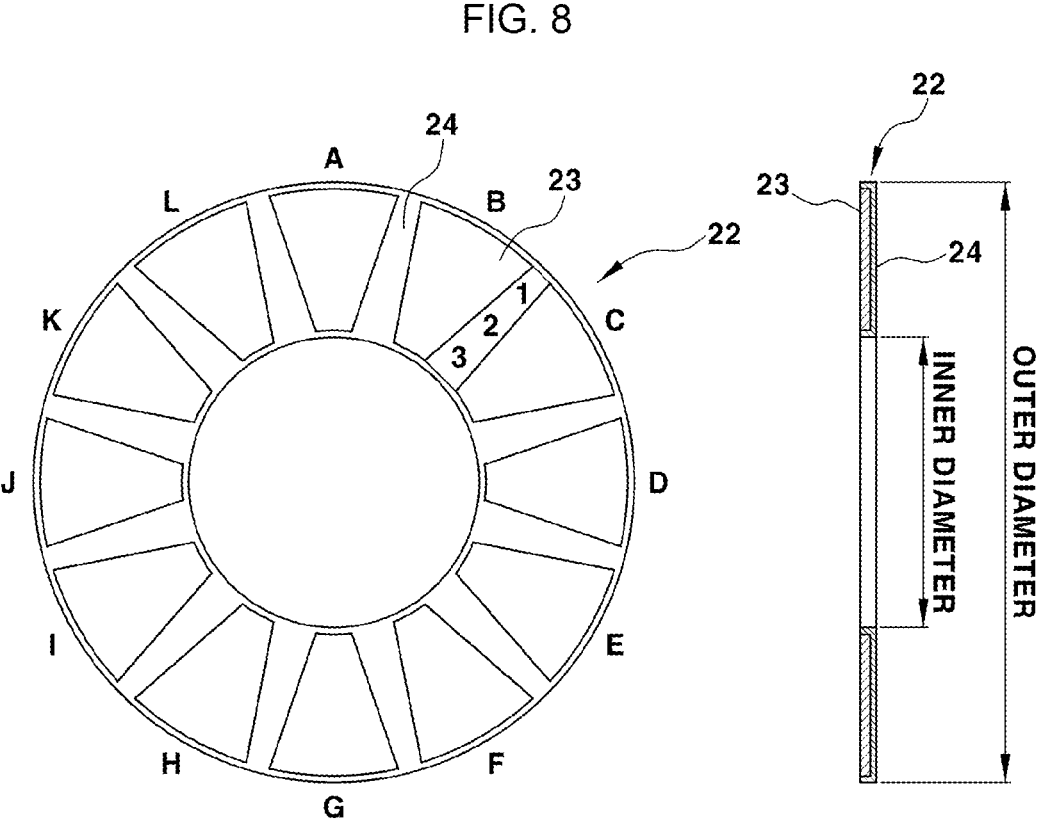
FIG. 8 is a front view and a cross-sectional view illustrating the permanent magnet resin molded product of the rotor according to the first embodiment of the present disclosure.

FIG. 8 is a front view and a cross-sectional view illustrating the permanent magnet resin molded product 22 manufactured by the molding process using the resin composition for a molding material in the rotor according to the first embodiment of the present disclosure. In FIG. 8, positions of the permanent magnets 23 are indicated by A to L, and radial positions on the permanent magnet 23 are distinguished and indicated by 1, 2, and 3.

The present inventor has manufactured a plurality of permanent magnet resin molded products 22 (#1 to 4) by applying the molding process using the resin composition for a molding material as described above and measured thicknesses (heights of the molded product) at the radial positions 1, 2, and 3 on the permanent magnets 23 (A to L) of the manufactured permanent magnet resin molded product 22. The measurement results are shown in Tables 1 to 4 below.

TABLE 1

| | INNER DIAMETER | OUTER DIAMETER | HEIGHT (4.0 ± 0.05) | | |
|---|---|---|---|---|---|
| | (124 ± 0.05) | (262 ± 0.05) | 1 | 2 | 3 |
| # 1 | 124.033 | 261.959 | A 3.999 | 4.007 | 4.020 |
| CURED | | | B 4.001 | 3.988 | 4.029 |
| PRODUCT | | | C 4.008 | 3.987 | 4.024 |
| DIMENSION | | | D 4.014 | 4.018 | 4.020 |
| (mm) | | | E 3.996 | 4.000 | 4.006 |
| | | | F 4.008 | 4.001 | 4.012 |
| | | | G 4.032 | 4.018 | 4.022 |
| | | | H 4.038 | 4.031 | 4.032 |
| | | | I 4.023 | 4.005 | 4.015 |
| | | | J 4.006 | 4.006 | 4.010 |
| | | | K 3.998 | 3.999 | 4.005 |
| | | | L 3.998 | 3.995 | 4.010 |

TABLE 2

| | INNER DIAMETER | OUTER DIAMETER | HEIGHT (4.0 ± 0.05) | | |
|---|---|---|---|---|---|
| | (124 ± 0.05) | (262 ± 0.05) | 1 | 2 | 3 |
| # 2 | 124.018 | 262.006 | A 4.007 | 4.001 | 4.002 |
| CURED | | | B 4.000 | 4.003 | 4.004 |
| PRODUCT | | | C 3.996 | 3.992 | 4.010 |
| DIMENSION | | | D 4.013 | 4.001 | 4.025 |
| (mm) | | | E 4.040 | 4.025 | 4.038 |
| | | | F 4.040 | 4.039 | 4.041 |
| | | | G 4.035 | 4.029 | 4.034 |
| | | | H 4.022 | 4.018 | 4.023 |
| | | | I 4.006 | 3.997 | 4.009 |
| | | | J 4.001 | 3.996 | 4.013 |
| | | | K 3.989 | 3.992 | 4.013 |
| | | | L 4.032 | 4.020 | 4.019 |

TABLE 3

| | INNER DIAMETER | OUTER DIAMETER | HEIGHT (4.0 ± 0.05) | | |
|---|---|---|---|---|---|
| | (124 ± 0.05) | (262 ± 0.05) | 1 | 2 | 3 |
| # 3 | 123.998 | 262.029 | A 4.000 | 4.005 | 4.018 |
| CURED | | | B 3.996 | 3.997 | 4.019 |
| PRODUCT | | | C 3.991 | 3.985 | 4.013 |
| DIMENSION | | | D 4.002 | 3.993 | 4.011 |
| (mm) | | | E 4.011 | 4.016 | 4.016 |
| | | | F 4.028 | 4.026 | 4.023 |
| | | | G 4.026 | 4.016 | 4.025 |
| | | | H 4.018 | 3.992 | 4.018 |
| | | | I 4.014 | 3.999 | 4.016 |
| | | | J 3.996 | 3.998 | 4.005 |
| | | | K 4.001 | 4.003 | 4.005 |
| | | | L 4.000 | 4.011 | 4.005 |

TABLE 4

| | INNER DIAMETER | OUTER DIAMETER | HEIGHT (4.0 ± 0.05) | | |
| | (124 ± 0.05) | (262 ± 0.05) | 1 | 2 | 3 |
| --- | --- | --- | --- | --- | --- |
| # 4 | 124.024 | 262.042 | A 4.002 | 4.008 | 4.026 |
| CURED | | | B 4.007 | 4.022 | 4.042 |
| PRODUCT | | | C 4.024 | 4.039 | 4.031 |
| DIMENSION | | | D 4.031 | 4.043 | 4.034 |
| (mm) | | | E 4.028 | 4.036 | 4.023 |
| | | | F 4.042 | 4.041 | 4.038 |
| | | | G 4.016 | 4.015 | 4.026 |
| | | | H 3.994 | 3.992 | 4.023 |
| | | | I 4.003 | 3.994 | 4.025 |
| | | | J 3.993 | 3.983 | 4.013 |
| | | | K 4.009 | 4.006 | 4.026 |
| | | | L 4.019 | 4.029 | 4.025 |

As shown in Tables 1 to 4, it can be seen from the measurement result that both the horizontality of 0.03 and the tolerance of 0.05, which are the requirements, are satisfied.

According to the present disclosure described above, the molding technology using the resin composition for a molding material is used, which makes it possible to ensure the horizontality and the inner/outer diameter tolerance of the permanent magnet resin molded product 22. Further, the horizontality and the inner/outer diameter tolerance may be ensured even in the integrated rotor 20 in which the core 21, the permanent magnet resin molded product 22, and the plate 25 are combined.

In addition, the horizontality of the permanent magnet and the stator may be ensured, and the air gap between permanent magnets and the stator may be constant.

Figure 9:
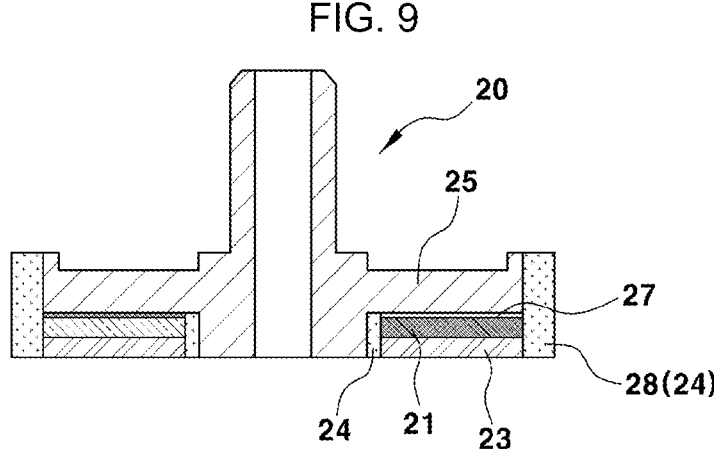
FIG. 9 is a cross-sectional view illustrating a rotor according to a second embodiment of the present disclosure.
Figure 10:
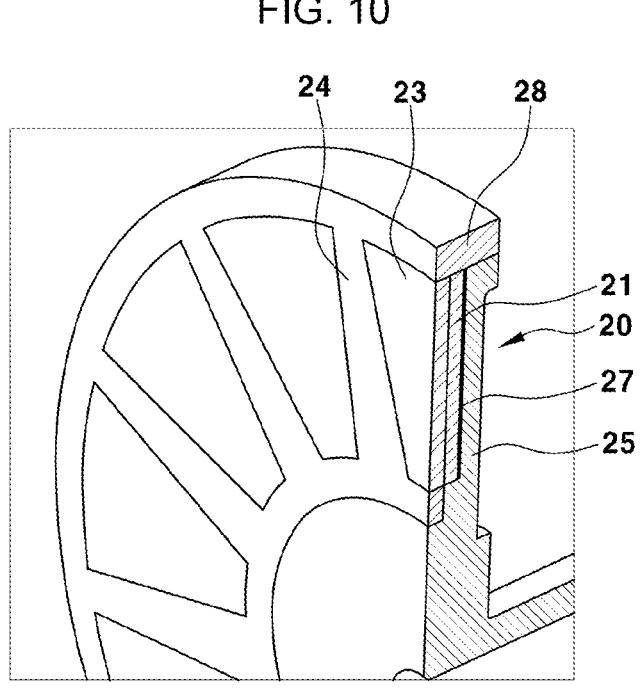
FIG. 10 is a cut-away perspective view illustrating the rotor according to the second embodiment of the present disclosure.

Next, FIG. 9 is a cross-sectional view illustrating a rotor according to a second embodiment of the present disclosure, and FIG. 10 is a cut-away perspective view illustrating the rotor according to the second embodiment of the present disclosure.

In the second embodiment of the present disclosure, the separated permanent magnets 23, the core 21, and the plate 25 are disposed together at predetermined positions in a cavity of a mold, and then a molten resin composition for a molding material is injected into the cavity of the mold, thereby forming the molding part 24 on the permanent magnets 23, the core 21, and the plate 25. Therefore, it is possible to manufacture the circular rotor 20 in which the permanent magnets 23, the core 21, and the plate 25 are integrated by the resin composition for a molding material.

In this case, the core 21 and the plate 25 may be installed in the mold in a state in which the core 21 and the plate 25 are bonded in advance by the bonding agent 27. In addition, the plurality of permanent magnets 23 are installed in the mold so that the permanent magnets 23 are installed to be disposed on a surface of the core 21 and aligned at predetermined intervals in the circumferential direction.

As in the first embodiment, one surface of the permanent magnet 23 may be exposed to the outside at the time of molding the resin composition for a molding material, and the molding part 24 with a predetermined thickness also covers a surface of the core 21 between the adjacent permanent magnets 23.

In addition, an entire periphery of the lateral surface of each of the permanent magnets 23 is also covered by the molding part 24, and a space, which is defined by an inner peripheral surface of the core 21, an inner surface of the permanent magnet 23, and the plate 25 (particularly, a central boss portion of the plate), is also filled with the molding part 24.

However, a surface of the plate 25, which is opposite to a surface on which the permanent magnet 23 and the core 21 are stacked, may be exposed without being covered by the molding part 24. The molding part 24 is formed so that the molding part 24 may cover entire outer peripheral surfaces of the core 21 and the plate 25 and an entire outer surface of the permanent magnet 23.

Figure 4:
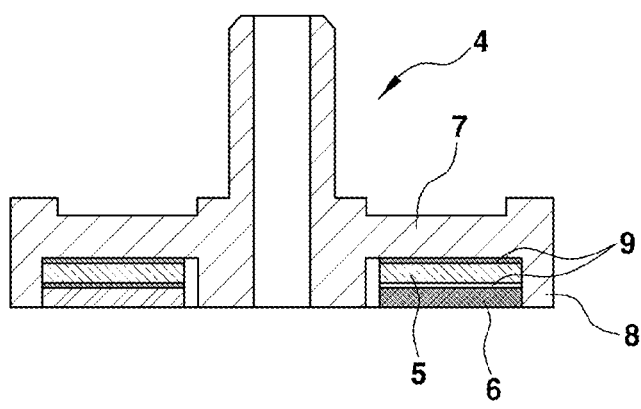
FIG. 4 is a cross-sectional view illustrating a state in which the rotor of the general axial flux motor is assembled.
Figure 5:
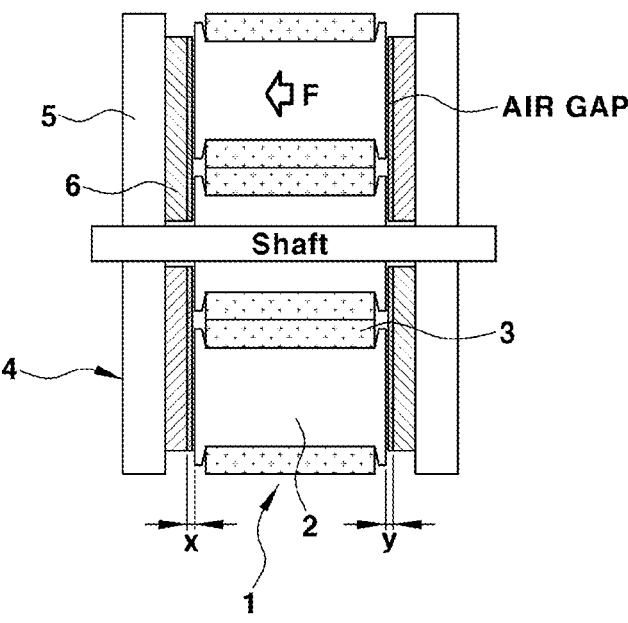
FIG. 5 is a view for explaining a problem in the related art.

In this case, the plate 25, which has a shape made by removing a portion corresponding to a support ring (reference numeral '8' in FIG. 4) in the related art, may be used. Instead, the molding part 24 is formed by molding along the entire periphery of a peripheral edge portion (outer peripheral portion) of the rotor 20, on which the support ring in the related art has been positioned, at the time of molding the resin composition for a molding material, such that a ring portion 28 of the molding part 24 is formed along the entire peripheral edge portion of the rotor 20.

With reference to FIG. 10, it can be seen that the ring portion 28 is formed at the position of the support ring in the related art. With reference to FIG. 10, the ring portion 28 with a predetermined thickness is formed to cover outer surfaces of the permanent magnets 23 arranged in the circumferential direction (outer surfaces based on a radial direction of the rotor) and the outer peripheral surface of the core 21.

In addition, the molding part 24 is formed by molding to cover, with a predetermined thickness, the entire periphery of the outer peripheral surface of the plate 25. Therefore, the ring portion 28 is shaped to cover not only the outer surfaces of the permanent magnets 23 but also the outer peripheral surfaces of the core 21 and the plate 25.

The ring portion 28 serves as the support ring of the plate in the related art, i.e., serves to support the permanent magnets so that the permanent magnets 23 are not withdrawn and scattered in the radial direction by a centrifugal force.

The plate 25 of the rotor for an axial flux motor 20 may be made of a material such as S54C. In case that the plate having a support ring (reference numeral 26 in FIG. 6) is applied, most core losses are concentrated on the support ring portion. Particularly, the core loss concentrated on the support ring 26 increases as the thickness of the core decreases.

Therefore, in the present disclosure, the support ring 26 is eliminated from the plate, and instead, the ring portion 28 is formed by molding the resin composition for a molding material at the position identical to the position of the support ring 26 in the related art, such that the ring portion 28 may serve as the support ring 26 of the plate in the related art.

The ring portion 28 may have a thickness and shape that may support and block the outer surfaces of the permanent magnets 23 so that the permanent magnets 23 are not withdrawn in the radial direction by a centrifugal force.

Figure 11:
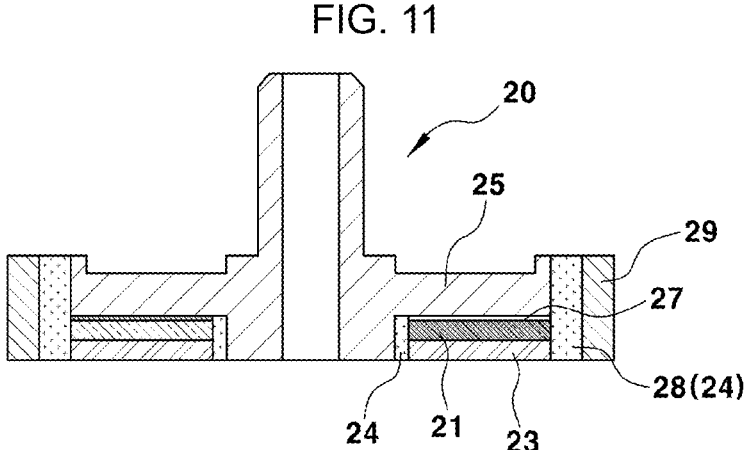
FIG. 11 is a cross-sectional view illustrating a rotor according to a third embodiment of the present disclosure.

In addition, FIG. 11 is a cross-sectional view illustrating a rotor according to a third embodiment of the present disclosure. The third embodiment provides a configuration in which a sleeve 29 is additionally stacked on an outer peripheral surface of the ring portion 28 of the rotor 20 according to the second embodiment. The sleeve 29, which is made of a reinforcing material, is additionally stacked along an entire periphery of the outer peripheral surface of the ring portion 28 of the rotor 20 that is configured as the molding part 24.

In this case, the reinforcing material may be carbon fiber reinforced plastic (CFRP). Because the sleeve 29 is formed to have a predetermined thickness along the entire periphery of the outer peripheral surface of the rotor 20, specifically the entire periphery of the outer peripheral surface of the ring portion 28 formed as the molding part 24, the sleeve 29 may also have a ring or cylindrical shape.

The sleeve 29 reinforces the ring portion 28 formed as the molding part 24 by molding and serves as the support ring 26, which supports the outer surfaces of the permanent magnets 23 together with the ring portion 28, i.e., serves to prevent the permanent magnets 23 from being scattered by a centrifugal force, instead of the support ring of the plate in the related art.

Because the sleeve 29 made of carbon fiber reinforced plastic is stacked on the surface of the portion (ring portion) formed by molding the resin composition for a molding material that is insulating plastic, there is a reduced risk of galvanic corrosion caused by a potential difference between stacked elements. Therefore, it is not necessary to interpose and add a separate layer for preventing galvanic corrosion, e.g., a galvanic corrosion prevention layer made of glass fiber reinforced plastic on a stack interface between the sleeve 29 and the ring portion 28.

Meanwhile, the present disclosure discloses a resin composition for a molding material that may be used as the resin composition for a molding material in order to manufacture the rotor according to the present disclosure. In the present disclosure, the resin composition for a molding material may include epoxy resin, a curing agent, a filler, silane A, silane B, wax, colorant, a catalyst, a flame retardant, and/or an additive that are main subjects.

Specifically, the resin composition for a molding material may include 0.1 to 15 wt. % of epoxy resin, 0.1 to 15 wt. % of a curing agent, 50 to 92 wt. % of a filler, 0.01 to 1 wt. % of silane A, 0.1 to 1 wt. % of silane B, 0.1 to 1 wt. % of wax, 0.1 to 1 wt. % of a colorant, 0.1 to 1 wt. % of a catalyst, 0.1 to 1 wt. % of a flame retardant, and 0.1 to 1 wt. % of an additive.

Table 5 below shows a composition of the resin composition for a molding material that may be used for the resin composition for a molding material in the present disclosure.

agent, the filler is used to improve strength and fluidity, and silane A and silane B are used to increase an attachment force with the rotor made of metal. In addition, the wax is used to provide release from the mold used to mold the resin composition for a molding material, the catalyst is used to adjust a curing speed, and the additive is used to capture ions.

As shown in Table 5, epoxy resin, which is typically used in the corresponding technical field, may be used as the epoxy resin. For example, epoxy resin having two or more epoxy groups included in a molecular structure may be used.

Non-restrictive examples of epoxy resin, which may be used, may include one or more of bisphenolic epoxy resin, alicyclic epoxy resin, cresol novolak epoxy resin, biphenyl epoxy resin, naphthalene epoxy resin, multifunctional epoxy resin, anthracene epoxy resin, non-condensed ring polycyclic epoxy resin, and bisphenol fluorene modified epoxy.

For example, phenol polymer with 3a,4,7,7a-tetrahydro-4,7-methano-1H-indene, glycidyl ether, which is cresol novolak epoxy resin, may be used.

Any curing agent publicly known in the corresponding technical field, which performs a curing reaction with epoxy resin, may be used as the curing agent. For example, the curing agent may be a phenolic compound having two or more phenolic hydroxyl groups in one molecule.

For example, the curing agent may include one or more curing agents selected from a group consisting of acid anhydride compound, phenolic novolak resin, cresol novolak resin, phenolic aralkyl resin, and multifunctional phenol compound.

For example, the curing agent may be phenol polymer with formaldehyde. In this case, it is possible to provide improved chemical resistance and curability.

Further, the filler may be formed from one or a combination of at least two components selected from a group consisting of nonmetallic oxide, metal nitride, nonmetallic nitride, inorganic hydrate, and inorganic salt. For example, a combination of silica, silica nitride, alumina, alumina nitride, boron nitride, and the like may be used. For example, silica may be used.

(3-mercaptopropyl) trimethoxysilane may be used as silane A, and n-phenyl-3-aminopropyl trimethoxysilane may be used as silane B.

TABLE 5

| CONSTITUENT ELEMENTS | COMPONENTS | RAW MATERIAL SPECIFICATIONS | CONTENT |
|---|---|---|---|
| EPOXY RESIN | Phenol polymer with 3a,4,7,7a-tetrahydro-4,7-methano-1H-indene, glycidyl ether Cas no: 0119345-05-0 EQUIVALENT: 265 g/eq | EPOXY EQUIVALENT: 250~280 g/eq SOFTENING POINT: 57~68° C. | 0.1~10 wt % |
| CURING AGENT | Phenol polymer with formaldehyde Cas no.: 0009003-35-4 EQUIVALENT: 106 g/eq | OH EQUIVALENT: 102~112 g/eq VISCOSITY: 1.5~2.5 poise | 0.1~10 wt % |
| FILLER | SILICA(Silicon dioxide (surface treated)) | D50: 8~16 μm | 80~90 wt % |
| SILANE | [SILANE A] (3-Mercaptopropyl) Trimethoxysilane | PURITY: Min 95% | 0.1~1 wt % |
| | [SILANE B] N-Phenyl-3-aminopropyl trimethoxysilane | PURITY: Min 95% | 0.1~1 wt % |
| WAX | Fatty acids, montan-wax, ethylene esters | SAPONIFICATION VALUE: 140~160 mgKOH/g | 0.1~1 wt % |
| COLORANT | Carbon black | SPECIFIC SURFACE AREA: 140 m2/g DBP | 0.1~1 wt % |
| CATALYST | Triphenylphosphine | PURITY: min 96% | 0.1~1 wt % |
| FLAME RETARDANT | Aluminum hydroxide (Al(OH)$_3$) | D50: Max 10 μm | 0.1~1 wt % |
| ADDITIVE | (Carbonato)hexadecahydroxydialuminumhexamagnesium | SPECIFIC SURFACE AREA: 5~15 m$^2$/g | 0.1~1 wt % |

In the composition, the epoxy resin may impart insulation properties by being cured while reacting with the curing Fatty acid, montan-wax, ethylene ester, silicone oil, paraffin wax, carnauba wax, and the like may be used as the wax. Carbon black may be used as the colorant. An imidazole-based catalyst or a phosphorus-based catalyst may be used as the catalyst. For example, triphenylphosphine may be used as the catalyst.

In addition, any flame retardant, which imparts flame retardancy, may be used as the flame retardant without being particularly limited. For example, metal hydroxide or aluminum hydroxide (Al(OH)3) may be used as the flame retardant. (Carbonato) hexadecahydroxydialuminum-hexamagnesium may be used as the additive. However, the present disclosure is not limited thereto.

EXAMPLES AND COMPARATIVE EXAMPLES

As Examples 1 to 4, a rotor for an axial flux motor having the configuration according to the first embodiment was manufactured by using the resin composition for a molding material having the composition and content shown in Table 6 below.

TABLE 6

| ITEM | CONTENT (wt. %) | | | |
| --- | --- | --- | --- | --- |
| | EXAMPLE 1 | EXAMPLE 2 | EXAMPLE 3 | EXAMPLE 4 |
| EPOXY RESIN - A | 11.3 | 9.1 | 6.9 | 4.7 |
| CURING AGENT | 4.4 | 3.6 | 2.8 | 2 |
| FILLER | 82 | 85 | 88 | 90 |
| SILANE -A | 0.05 | 0.05 | 0.05 | 0.05 |
| SILANE -B | 0.65 | 0.65 | 0.65 | 0.65 |
| WAX | 0.2 | 0.2 | 0.2 | 0.2 |
| COLORANT | 0.25 | 0.25 | 0.25 | 0.25 |
| CATALYST | 0.35 | 0.35 | 0.35 | 0.35 |
| FLAME RETARDANT | 0.5 | 0.5 | 0.5 | 0.5 |
| ADDITIVE | 0.3 | 0.3 | 0.3 | 0.3 |

As Comparative Examples 1 to 4, a rotor for an axial flux motor having the configuration according to the first embodiment was manufactured by using the resin composition for a molding material having the composition and content shown in Table 7 below.

TABLE 7

| ITEM | CONTENT (wt. %) | | | |
| --- | --- | --- | --- | --- |
| | COMPARATIVE EXAMPLE 1 | COMPARATIVE EXAMPLE 2 | COMPARATIVE EXAMPLE 3 | COMPARATIVE EXAMPLE 4 |
| EPOXY RESIN - A | — | — | — | 3.3 |
| EPOXY RESIN - B | 6.9 | 6.9 | 6.9 | — |
| CURING AGENT | 2.8 | 2.8 | 2.8 | 1.4 |
| FILLER | 88 | 88 | 88 | 93 |
| SILANE -A | 0.05 | — | — | 0.05 |
| SILANE -B | 0.65 | 0.65 | — | 0.65 |
| WAX | 0.2 | 0.2 | 0.2 | 0.2 |
| COLORANT | 0.25 | 0.25 | 0.25 | 0.25 |
| CATALYST | 0.35 | 0.35 | 0.35 | 0.35 |
| FLAME RETARDANT | 0.5 | 0.5 | 0.5 | 0.5 |
| ADDITIVE | 0.3 | 0.3 | 0.3 | 0.3 |

In Table 7, 'epoxy resin-A' is epoxy resin in Table 5 used in the present disclosure, and 'epoxy resin-B' is epoxy resin used for a general-purpose resin composition for a molding material.

In the Comparative Example, formaldehyde polymer with (chloromethyl) oxirane and 2-methylphenol (softening point of 68° C.), which is epoxy resin for a general-purpose resin composition for a molding material, was used as epoxy resin-B.

Next, the present inventor measured S/F values, G/T values, contraction ratios, attachment forces, and flatness in respect to Examples 1 to 4 and Comparative Examples 1 to 4, and the measurement results are shown in Tables 8 and 9.

The S/F (spiral flow) value was tested and measured by setting a temperature of a mold press to 175° C. and adjusting a temperature of an actual mold to 170±5° C. In addition, the spiral flow value was measured by using a spiral flow measurement mold defined based on ASTM D 3123-72 under a condition in which transfer pressure was 100±25 psi, a transfer speed was 1 to 4 inches/sec, and a curing time was 120 seconds. The spiral flow was measured after a proper amount of samples were obtained so that a cull thickness was 3±0.5 mm after the measurement.

The G/T (gelation time, curing time) was measured by preheating a hot plate based on an actually measured temperature of 170° C.±3° C., placing a sample of 2 g on the hot plate, and operating a stopwatch. A thin film was formed by using a spatula, the stopwatch was stopped, and the time was read at an endpoint at which the curing was started and the film began to crack.

In order to measure the contraction ratio, a contraction ratio was calculated by using a specimen length at a molding temperature of 175° C. and a specimen length at room temperature by using a specimen of 130 mm (horizontal)× 6.5 mm (vertical)×6.0 mm (thickness) in size.

The attachment force was measured by molding the resin composition for a molding material into a cylindrical shape of 5.5 mm on a permanent magnet of a 10 mm (horizontal)× 10 mm (vertical)×0.5 (thickness) size and using a die shear tester. A condition identical to the condition for the measurement of the spiral flow was used as the molding condition.

In order to measure the flatness, the resin composition for a molding material was molded on the permanent magnet, a height at a predetermined position on the surface of the permanent magnet surface was measured, and a height at a predetermined position on a molding portion of the resin composition for a molding material between the permanent magnets was measured, such that height deviations between the positions were measured. The smaller the deviation, the better the flatness.

As a result, it is possible to solve the problem of the occurrence of the permanent magnet suction force toward the stator caused by non-uniformity of the air gap and non-uniformity of the axial electromagnetic force and to solve the problem of deterioration in performance of the actually manufactured product in comparison with the analysis model.

In addition, the object of the present disclosure is to manufacture the rotor for an axial flux motor, in which the

TABLE 8

| ITEM | | EXAMPLE 1 | EXAMPLE 2 | EXAMPLE 3 | EXAMPLE 4 |
|---|---|---|---|---|---|
| Spiral Flow (S/F) | Inch | 98 | 75 | 58 | 42 |
| Gelation time (G/T) | Sec | 45 | 39 | 34 | 30 |
| CONTRACTION RATIO | % | 0.59 | 0.38 | 0.17 | 0.10 |
| ATTACHMENT FORCE (PERMANENT MAGNET) | kgf | 13.5 | 13.3 | 13.2 | 13.3 |
| FLATNESS (HEIGHT DEVIATION) AFTER MOLDING | mm | 0.211 | 0.158 | 0.103 | 0.062 |

TABLE 9

| ITEM | | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|
| S/F | Inch | 29 | 29 | 27 | 18 |
| G/T | Sec | 30 | 30 | 29 | 24 |
| CONTRACTION RATIO | % | 0.31 | 0.33 | 0.31 | 0.08 |
| ATTACHMENT FORCE (PERMANENT MAGNET) | kgf | 9.6 | 8.3 | 6.9 | 11.5 |
| FLATNESS (HEIGHT DEVIATION) AFTER MOLDING | mm | 0.192 | 0.185 | 0.189 | NOT MEASURABLE BECAUSE OF NON-MOLDABILITY |

As can be seen in Tables 6 to 9, the contraction ratio decreases as the filler content increases. The low contraction ratio is also advantageous for the flatness after molding the resin composition for a molding material on the permanent magnet. However, in the case of Comparative Example 4 in which the filler content is 92 wt. %, the S/F was shortened to 18 inches, which caused non-filling during the molding process and made the molding difficult.

During the process of manufacturing the rotor for an axial flux motor according to the present disclosure, a molding area of the resin composition for a molding material is very large. Therefore, the S/F of the resin composition for a molding material may be 40 inches or more to stably produce the product.

In addition, it can be seen that where general epoxy resin-B is used as in Comparative Examples 1 to 3, the flatness is increased after molding because of a relatively high contraction ratio, and there may be difficulty with workability because the S/F is 30 inches or less. In addition, it can be seen that the attachment force with the permanent magnet is relatively low in case that general epoxy resin-B is used.

According to the rotor for an axial flux motor and the method of manufacturing the same according to the present disclosure described above, the technology for molding the resin composition for a molding material may be used to solve the problem of non-uniformity of the air gap dimension caused by manufacturing and assembling deviations between the individual sub-components and to ensure the horizontality and the inner/outer diameter tolerance.

assurance of the air gap is important to improve the performance of the motor, by using the process of molding the resin composition for a molding material. The present disclosure provides the resin composition for a molding material that has improved flatness (low contraction ratio), improved material fluidity (high S/F), and the high bonding force with the permanent magnet in comparison with the bonding agent and the general-purpose resin composition for a molding material in the related art.

Although the embodiments of the present disclosure have been described in detail hereinabove, the right scope of the present disclosure is not limited thereto, and many variations and modifications made by those skilled in the art using the basic concept of the present disclosure, which is defined in the following claims, will also belong to the right scope of the present disclosure.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A method of manufacturing a rotor for a motor, the method comprising:

preparing a rotor plate, a rotor core, and a plurality of permanent magnets;

coupling the rotor core to the rotor plate; and forming a molding part, wherein the molding part is formed by molding a resin composition for a molding material on the plurality of permanent magnets so that the molding part is shaped to integrally connect the plurality of permanent magnets in a circumferential direction of the rotor core, wherein the rotor is manufactured such that the rotor plate, the rotor core, the plurality of permanent magnets, and the formed molding part are coupled, wherein the molding part covers a surface of the rotor core between adjacent permanent magnets in the plurality of permanent magnets.

2. The method of claim 1, wherein the rotor core is coupled and bonded to the rotor plate using a bonding agent.

3. The method of claim 1, wherein a permanent magnet resin molded product, in which the molding part is integrated with the plurality of permanent magnets, is manufactured by installing the plurality of permanent magnets so that the plurality of permanent magnets are arranged in the circumferential direction in a mold for forming the molding part, and injecting a molten resin composition for a molding material into the mold, and wherein the permanent magnet resin molded product is coupled to a surface of the rotor core coupled to the rotor plate.

4. The method of claim 3, wherein the permanent magnet resin molded product is bonded to the surface of the rotor core coupled to the rotor plate using a bonding agent.

5. The method of claim 3, wherein the molding part is formed so that a first surface of each of the permanent magnets is exposed, and a second surface of each of the permanent magnets is embedded in the molding part.

6. The method of claim 1, wherein the molding part is formed on the plurality of permanent magnets by:

installing the rotor plate, the rotor core, and the plurality of permanent magnets in a mold for forming the molding part, wherein the rotor plate is coupled to the rotor core, and wherein the plurality of permanent magnets are arranged in the circumferential direction; and injecting a molten resin composition for a molding material into the mold.

7. The method of claim 6, wherein the rotor core is coupled and bonded to the rotor plate using a bonding agent.

8. The method of claim 6, wherein the molding part is formed so that a first surface of each of the permanent magnets is exposed, and a second surface of each of the permanent magnets is embedded in the molding part.

9. The method of claim 8, wherein the molding part is formed to cover each of an outer peripheral surface of the rotor core, an outer peripheral surface of the rotor plate, and outer surfaces of the arranged permanent magnets, and wherein a ring portion of the molding part, which covers the each of the outer peripheral surface of the rotor core, the outer peripheral surface of the rotor plate, and the outer surfaces of the arranged permanent magnets, serves as a support ring that prevents the permanent magnets from being scattered by a centrifugal force.

10. The method of claim 9, wherein a sleeve, comprising carbon fiber reinforced plastic, is formed along an entire periphery of an outer peripheral surface of the ring portion.

11. The method of claim 1, wherein the resin composition for a molding material for forming the molding part comprises:

0.1 to 15 wt. % of epoxy resin;
0.1 to 15 wt. % of a curing agent;
50 to 92 wt. % of a filler;
0.01 to 1 wt. % of silane A;
0.1 to 1 wt. % of silane B;
0.1 to 1 wt. % of wax;

18

0.1 to 1 wt. % of a colorant;
0.1 to 1 wt. % of a catalyst;
0.1 to 1 wt. % of a flame retardant; and
0.1 to 1 wt. % of an additive.

12. A rotor for a motor, the rotor comprising:
a rotor core;
a plurality of permanent magnets arranged in a circumferential direction of the rotor core;
a rotor plate coupled to the rotor core; and
a molding part formed by molding a resin composition for a molding material on the plurality of permanent magnets so that the molding part is shaped to integrally connect the plurality of permanent magnets arranged in the circumferential direction, wherein the rotor plate, the rotor core, the plurality of permanent magnets, and the formed molding part are coupled on the rotor, wherein the molding part covers a surface of the rotor core between adjacent permanent magnets in the plurality of permanent magnets.

13. The rotor of claim 12, wherein the rotor plate and the rotor core are coupled and bonded using a bonding agent.

14. The rotor of claim 12, wherein a first surface of each of the plurality of permanent magnets is exposed, and a second surface of each of the plurality of permanent magnets is embedded in the molding part.

15. The rotor of claim 14, wherein the molding part formed on the plurality of permanent magnets is coupled and bonded to a surface of the rotor core using a bonding agent.

16. The rotor of claim 12, wherein the molding part is formed to cover an outer peripheral surface of the rotor core, an outer peripheral surface of the rotor plate, and the first surface of each of the plurality of permanent magnets arranged in the circumferential direction, and wherein a ring portion of the molding part covers the outer peripheral surface of the rotor core, the outer peripheral surface of the rotor plate, and the outer surfaces of the arranged permanent magnets, the ring portion serving as a support ring that prevents the permanent magnets from being scattered by a centrifugal force.

17. The rotor of claim 12, wherein the resin composition for a molding material for forming the molding part on the plurality of permanent magnets comprises:

0.1 to 15 wt. % of epoxy resin;
0.1 to 15 wt. % of a curing agent;
50 to 92 wt. % of a filler;
0.01 to 1 wt. % of silane A;
0.1 to 1 wt. % of silane B;
0.1 to 1 wt. % of wax;
0.1 to 1 wt. % of a colorant;
0.1 to 1 wt. % of a catalyst;
0.1 to 1 wt. % of a flame retardant; and
0.1 to 1 wt. % of an additive.

18. A method of manufacturing a rotor for a motor, the method comprising:

preparing a rotor plate, a rotor core, and a plurality of permanent magnets;

coupling the rotor core to the rotor plate; and forming a molding part, wherein the molding part is formed by molding a resin composition for a molding material on the plurality of permanent magnets so that the molding part is shaped to integrally connect the plurality of permanent magnets in a circumferential direction of the rotor core, wherein the rotor is manufactured such that the rotor plate, the rotor core, the plurality of permanent magnets, and the formed molding part are coupled, wherein the molding part is formed by a molding process in which the plurality of permanent magnets is installed in a cavity of a mold to be disposed at predetermined intervals in a circumferential direction, and then the molten resin composition for a molding material is injected into the cavity of the mold in which the permanent magnets are installed.

* * * * *